US011732512B2

(12) United States Patent
Di Carlo et al.

(10) Patent No.: US 11,732,512 B2
(45) Date of Patent: Aug. 22, 2023

(54) REMOTELY LOCKED AIRLINE OVERHEAD BINS

(71) Applicant: The Boeing Company, Chicago, IL (US)

(72) Inventors: Tony Di Carlo, Long Beach, CA (US); Michael Karapetian, Huntington Beach, CA (US); Binh Tran, Westminster, CA (US)

(73) Assignee: THE BOEING COMPANY, Arlington, VA (US)

( * ) Notice: Subject to any disclaimer, the term of this patent is extended or adjusted under 35 U.S.C. 154(b) by 1150 days.

(21) Appl. No.: 16/397,399

(22) Filed: Apr. 29, 2019

(65) Prior Publication Data

US 2020/0340274 A1    Oct. 29, 2020

(51) Int. Cl.
*E05B 77/46* (2014.01)
*B64D 11/00* (2006.01)
*E05B 79/20* (2014.01)
*E05C 3/26* (2006.01)

(52) U.S. Cl.
CPC ............ *E05B 77/46* (2013.01); *B64D 11/003* (2013.01); *E05B 79/20* (2013.01); *E05C 3/26* (2013.01); *E05Y 2900/502* (2013.01)

(58) Field of Classification Search
CPC . E05B 77/46; E05B 77/48; E05C 3/24; E05C 3/26; E05C 3/28; E05C 3/00; E05Y 2900/502; B64D 11/003
See application file for complete search history.

(56) References Cited

U.S. PATENT DOCUMENTS

| 5,441,218 | A | 8/1995 | Mueller et al. |
| 5,456,529 | A | 10/1995 | Cheung |
| 6,089,626 | A * | 7/2000 | Shoemaker ......... E05B 65/0021 292/201 |
| 6,962,375 | B2 * | 11/2005 | Linares ..................... E05C 3/24 292/201 |
| 7,513,541 | B1 * | 4/2009 | Gregory .................... E05C 3/24 292/216 |
| 7,552,954 | B2 * | 6/2009 | Rozo ........................ E05B 41/00 292/DIG. 31 |
| 7,802,826 | B2 * | 9/2010 | Schmitz ................ E05B 13/004 292/216 |
| 8,665,119 | B2 * | 3/2014 | Hashberger ............... E05C 3/24 361/837 |
| 8,770,515 | B1 * | 7/2014 | Cloud .................. B64D 11/003 292/28 |

(Continued)

FOREIGN PATENT DOCUMENTS

WO     2017178078 A1    10/2017

*Primary Examiner* — Christopher J Boswell
(74) *Attorney, Agent, or Firm* — Coats & Bennett, PLLC

(57) ABSTRACT

A storage system that includes storage bins and a locking system. The locking system includes an actuation lever, pins that engage with the storage bins, and an elongated link that extends between and connects the actuation lever to the pins. The locking system is selectively movable between a locked position with the actuation lever in a first position and the pins engaged with the storage bins to prevent the storage bins from moving from the closed position, and an unlocked position with the actuation lever in a second position and the pins disengaged from the storage bins to allow the storage bins to move between the open and closed positions.

20 Claims, 9 Drawing Sheets

(56) References Cited

U.S. PATENT DOCUMENTS

| | | | | |
|---|---|---|---|---|
| 9,731,827 | B2* | 8/2017 | Long | E05C 3/24 |
| 10,794,087 | B2* | 10/2020 | Teunis | E05C 3/24 |
| 11,274,469 | B2* | 3/2022 | Xu | E05C 3/24 |
| 11,591,063 | B2* | 2/2023 | Zekiecki | B64D 11/0023 |
| 2013/0290221 | A1 | 10/2013 | Jindel | |
| 2020/0190857 | A1* | 6/2020 | Liu | E05C 3/24 |
| 2020/0339276 | A1* | 10/2020 | Chengalva | B64D 45/00 |
| 2021/0355710 | A1* | 11/2021 | Schroeder | E05C 3/24 |
| 2022/0154491 | A1* | 5/2022 | Simmonds | E05C 3/24 |

* cited by examiner

REMOTELY LOCKED AIRLINE OVERHEAD BINS

TECHNOLOGICAL FIELD

The present disclosure relates generally to the field of storage systems and, more specifically, to storage systems that include a locking system for selectively locking storage bins.

BACKGROUND

Vehicles that transport people, such as aircraft, buses, and trains, typically include storage bins located near the passenger seats. The storage bins are sized to hold the passenger's personal items such as small suitcases, jackets, briefcases, etc. Aircraft, for example, have closable storage bins located above the passenger seats for securing their personal items.

Passengers are able to access the storage bins at various times. This can include when the passenger initial enters the vehicle and locates their seat. The passenger places their personal items in the storage bins prior to sitting down in their seat. During the trip, the passengers may be able to access the storage bins under normal conditions, such as when the flight is smooth (i.e., no turbulence) and the seatbelt sign has been turned off. The passengers can also access the storage bins to remove their personal items upon exiting the vehicle.

There are situations that can occur when the storage bins should not be accessed. This can include when the vehicle is involved in an event when it is necessary to quickly exit the vehicle. The passengers should disregard their personal items and instead just exit the vehicle as fast as possible for their own safety and the safety of other passengers. There have been numerous instances when during an emergency evacuation of a vehicle passengers have retrieved their personal items from the storage bins prior to exiting. This blocks the emergency exits and slows other passengers from exiting.

SUMMARY

One aspect is directed to a storage system. The storage system includes storage bins that are movable between an open position and a closed position. A latch on each of the storage bins to keep the storage bins from moving to the open position while in the closed position. A locking system locks the storage bins in the closed position. The locking system includes: an actuation lever; a plurality of pins with one of the pins positioned at each one of the storage bins; and an elongated link that extends between and connects the actuation lever to the pins with the elongated link configured to transfer motion of the actuation lever to the pins. The locking system is selectively movable between a locked position with the actuation lever in a first position and the pins engaged with the storage bins to prevent the storage bins from moving from the closed position, and an unlocked position with the actuation lever in a second position and the pins are disengaged from the storage bins to allow the storage bins to move between the open and closed positions.

In another aspect, each of the pins is biased to be disengaged from the storage bins.

In another aspect, a biasing member is attached to the link at a point away from the actuation lever with the biasing member applying a biasing force that biases the actuation lever towards the unlocked position.

In another aspect, each of the pins is mounted to one of the storage bins to move with the storage bins between the open and closed positions.

In another aspect, each of the pins includes a leg that is attached to the elongated link and a foot that extends outward from the leg and engages with the storage bin.

In another aspect, the elongated link includes an inner cable that is attached to the actuation lever and an outer sheath that extends around the inner cable with the outer sheath being stationary and the inner cable moving when the actuation lever moves between the first and second positions.

In another aspect, each of the latches includes a release lever that is engaged by the pins in the closed position.

In another aspect, a support frame supports the storage bins and pins that are attached to the support frame and engaged by the latches when the storage bins are in the closed positions.

In another aspect, the link includes a main section that is connected to the actuation lever and offshoot sections that extend between the main section and the pins.

One aspect is directed to a storage system. The storage system includes a support frame. Storage bins are mounted to the support frame and movable relative to the support frame between an open position and a closed position with each of the storage bins comprising: a body that extends around and forms a interior space; and a latch mounted to the body and that engages with the support frame in the closed position. A locking system locks the storage bins in the closed position and includes: an actuation lever; a plurality of pins that are each positioned at one of the storage bins; and an elongated link that extends from the actuation lever to each of the pins. The locking system is movable between a locked position and an unlocked position. In the locked position, the actuation lever is at a first position with each of the pins engaged with one of the latches to prevent the storage bins from moving from the closed position. In the unlocked position, the actuation lever is at a second position with each of the pins disengaged from the corresponding latch to allow movement of the storage bins between the open and closed positions.

In another aspect, a release lever on each of the latches can be actuated to unlock the latch from the support frame and move the storage bin to the open position with each of the pins positioned to engage with one of the release levers in the locked position.

In another aspect, each of the pins is attached to the body of one of the storage bins.

In another aspect, the elongated link includes a main section that is attached to the actuation lever and bin sections that extend from the main section and are connected to one of the pins.

In another aspect, a biasing member biases the main section of the elongated link to maintain the locking system in the locked position.

One aspect is directed to a method of securing storage bins. The method includes: positioning an actuation lever that is positioned in a cabin of a vehicle in a first position and engaging pins that are operatively connected to the actuation lever into engagement with each of a plurality of storage bins and locking the storage bins; and moving the actuation lever to a second position and disengaging each of the pins from the storage bins and unlocking the storage bins.

In another aspect, the method includes moving an elongated link that is connected to each of the actuation lever and the pins and moving the pins out of engagement with the storage bins when moving the actuation lever from the first position to the second position.

In another aspect, the method includes maintaining an outer sheath of the link stationary while moving an inner cable of the link and moving the pins out of engagement with the storage bins and into engagement with the storage bins.

In another aspect, the method includes positioning each of the pins underneath a release lever on the storage bins and locking the storage bins.

In another aspect, the method includes applying a biasing force and biasing the pins away from the storage bins.

In another aspect, the method includes biasing the actuation lever towards the open position and out of engagement with the storage bins.

DETAILED DESCRIPTION

Figure 1:
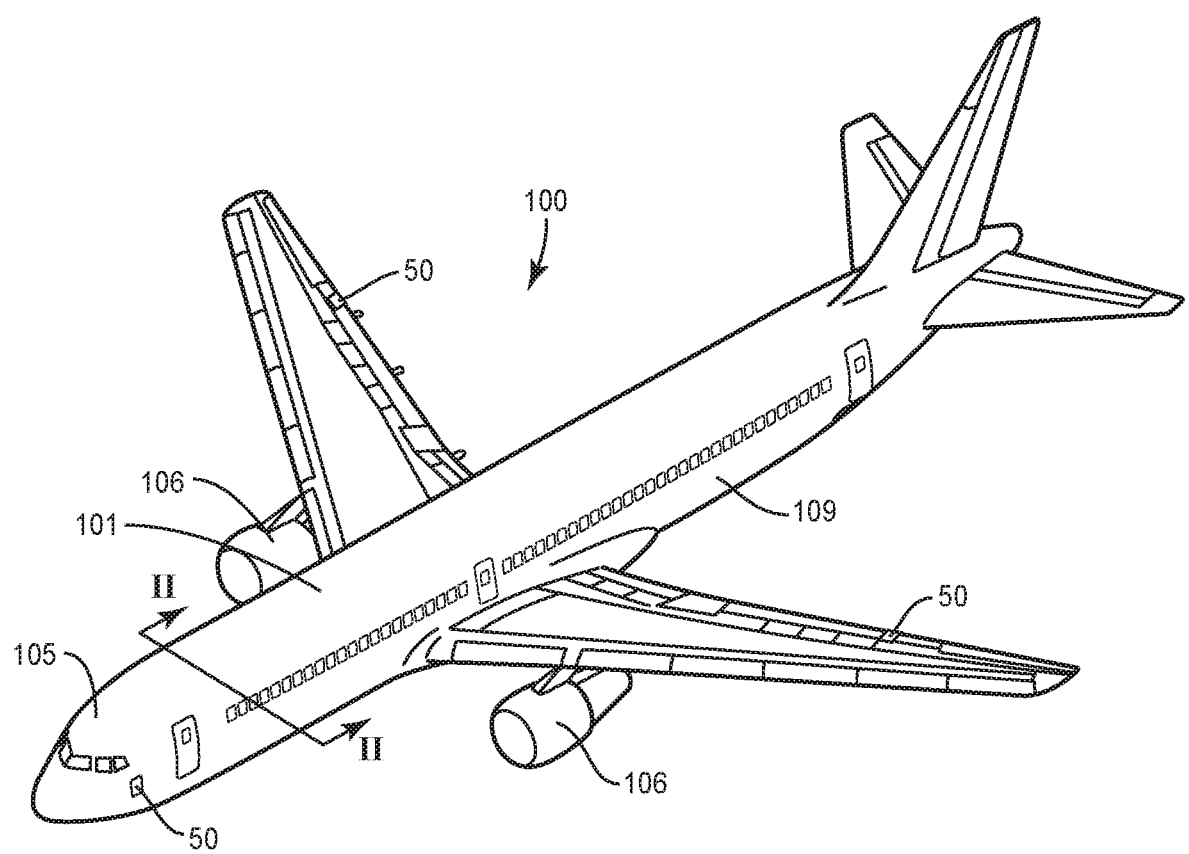
FIG. 1 is a perspective view of an aircraft.

FIG. 1 illustrates a vehicle 100, specifically an aircraft 100. The aircraft 100 includes a fuselage 109 with an interior cabin 101 to carry passengers. The cabin 101 can extend along a majority of the length of the fuselage. A cockpit 105 is positioned at the front of the fuselage 109.

Figure 2:
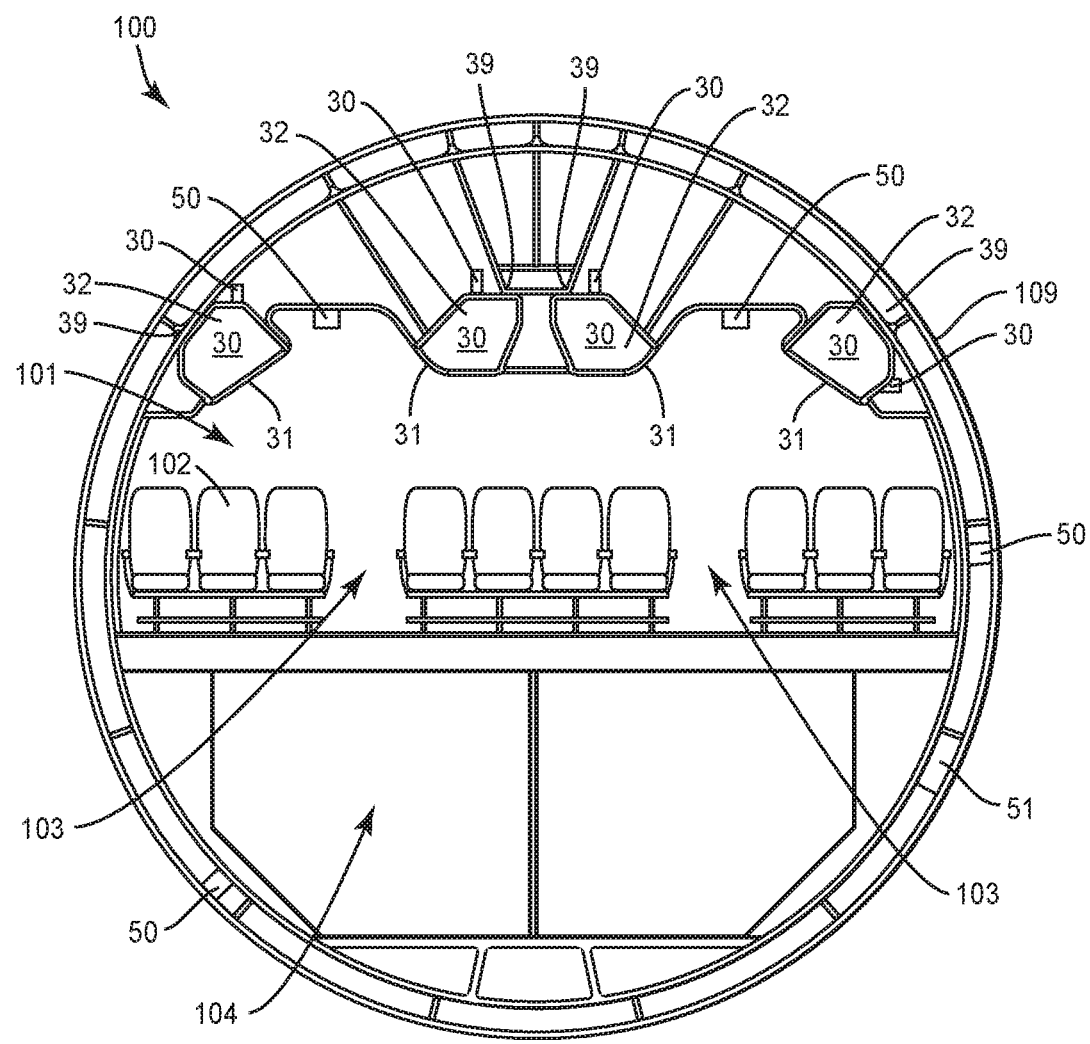
FIG. 2 is a section view of the aircraft of FIG. 1 cut along the line II-II.

FIG. 2 is a cross-sectional, schematic view of the fuselage 109 and the cabin 101 configured for use by the passengers. Seats 102 are spaced across the width and length of the cabin 101. One or more aisles 103 are formed between the seats 102 and can extend along the length of the cabin 101. The aisles 103 provide pathways for the passengers to enter and exit the vehicle 100, and move about the cabin 101 during flight. A cargo hold 104 can extend within the lower section of the fuselage 109 to carry larger passenger items (e.g., larger suitcases, boxes) as well as various other cargo.

Storage bins 30 are positioned in proximity to the seats 102 to hold the personal items of the passengers. The storage bins 30 include a body 31 that extends around and forms an interior space 32. The storage bins 30 can be positioned between a closed position that prevents access to the interior space 32, and an open position that allows access to the interior space 32. The storage bins 30 are attached to a support frame 39. The support frame 39 can include a housing that receives the storage bin 30. The support frame 39 can be attached to a structural member of the aircraft 100, such as an interior wall, support rod, and ceiling member.

Figure 3:
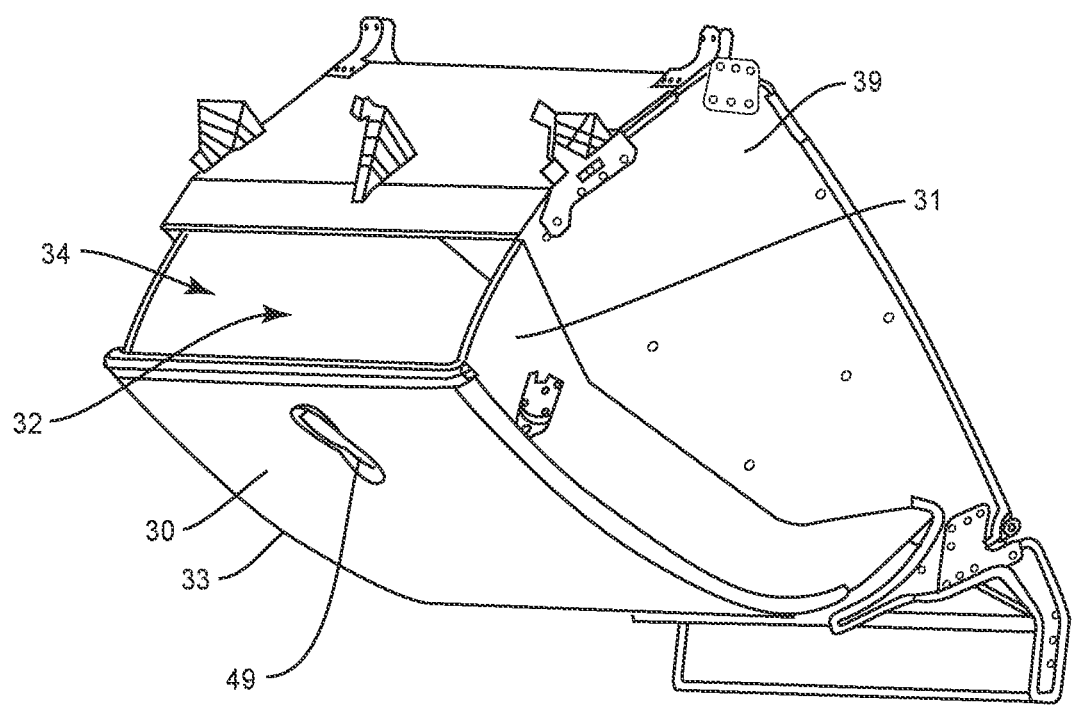
FIG. 3 is a perspective view of a storage bin mounted to a support frame and in an open position.

FIG. 3 illustrates a storage bin 30 positioned within a support frame 39. The storage bin 30 includes the body 31 that includes an opening 34 that leads into the interior space 32. The body 31 also includes a front side 33 that faces outward into the cabin 101. The storage bin 30 is movable relative to the support frame 39 between an open position as illustrated in FIG. 3 in which the interior space 32 is accessible, and a closed position in which the interior space 32 is not accessible. In one design as illustrated in FIG. 3, the entire body 31 is movable relative to the support frame 39. In another design, the front side 33 is movable relative to a remainder of the body 31 to control access to the interior space 32.

A handle 49 is positioned on the front side 33 for a passenger to move the storage bin 30 between the open and closed positions. The handle 49 is operatively connected to one or more latches 40 that are positioned on one or both of the lateral sides of the body 31. In one design, the handle 49 is connected to an elongated member that extends to the one or more latches 40. Movement of the handle 49 by a passenger causes the one or more latches 40 to move and thus provide for opening the storage bin 30.

Figure 5:
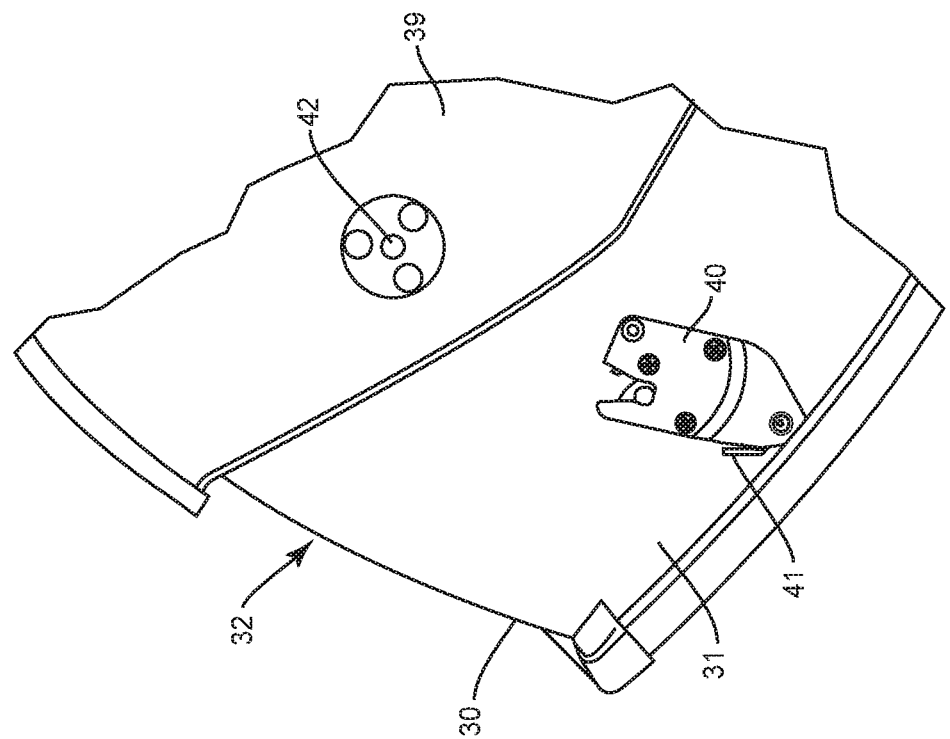
FIG. 5 is a side view of a latch disengaged from a pin with the storage bin in an open position.
Figure 4:
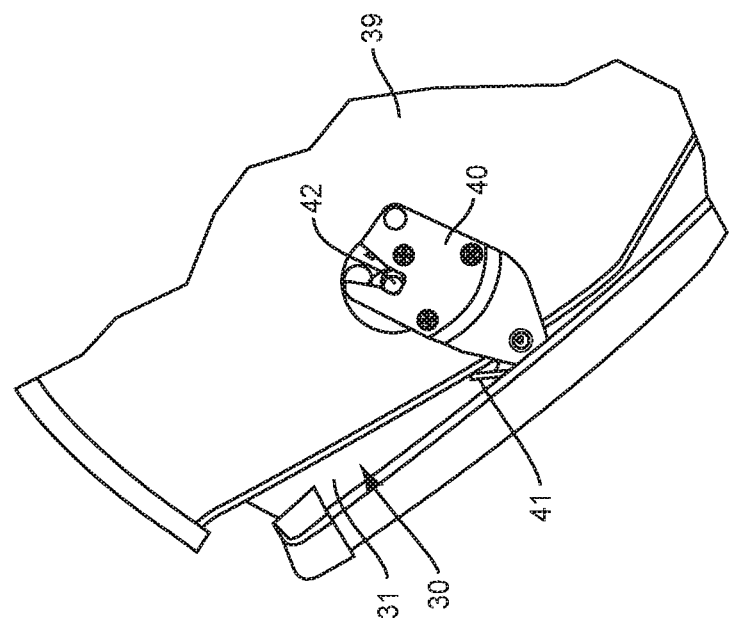
FIG. 4 is a side view of a latch engaged with a pin with the storage bin in a closed position.

FIGS. 4 and 5 illustrate a latch 40 connected to a lateral side of the body 31. In one design, the storage bin 30 includes a single latch 40 on one of the lateral sides. In another design, the storage bin 30 includes latches 40 on each of the two lateral sides with each of the latches 40 operating in a similar manner. As illustrated in FIG. 4, the latch 40 engages with a pin 42 on the support frame 39 in the closed position. Movement of the handle 49 on the front side 33 of the storage bin 30 causes the latch 40 to open allowing the storage bin 30 to move to the open position as illustrated in FIG. 5.

A release lever 41 is connected to the latch 40. The release lever 41 can be moved to release the latch 40 from the pin 42 and open the storage bin 30. As illustrated in FIG. 4, the release lever 41 extends outward from the latch 40 when the latch 40 is engaged with the pin 42 and the storage bin 30 is in the closed position. The release lever 41 is moved relative to the latch 40 causing the latch 40 to disengage from the pin 42 and allow the storage bin 30 to move from the closed position to the open position. In one design as illustrated in FIG. 5, the release lever 41 is positioned closer to the latch 40 in the open position.

The release lever 41 can be moved to cause the latch 40 to open and release from the pin 42. The release lever 41 can be used to open the storage bin 30 in the event the handle 49 malfunctions. The release lever 41 can be activated by applying a force that moves the release lever 41 relative to the latch 40 as illustrated in FIG. 5. In one method, an elongated tool can be inserted into a gap formed between the body 31 and the support frame 39. The tool can contact against and move the release lever 41 relative to the latch 40. This causes the latch 40 to release from the pin 42 and for the storage bin 30 to move to the open position.

Figure 6:
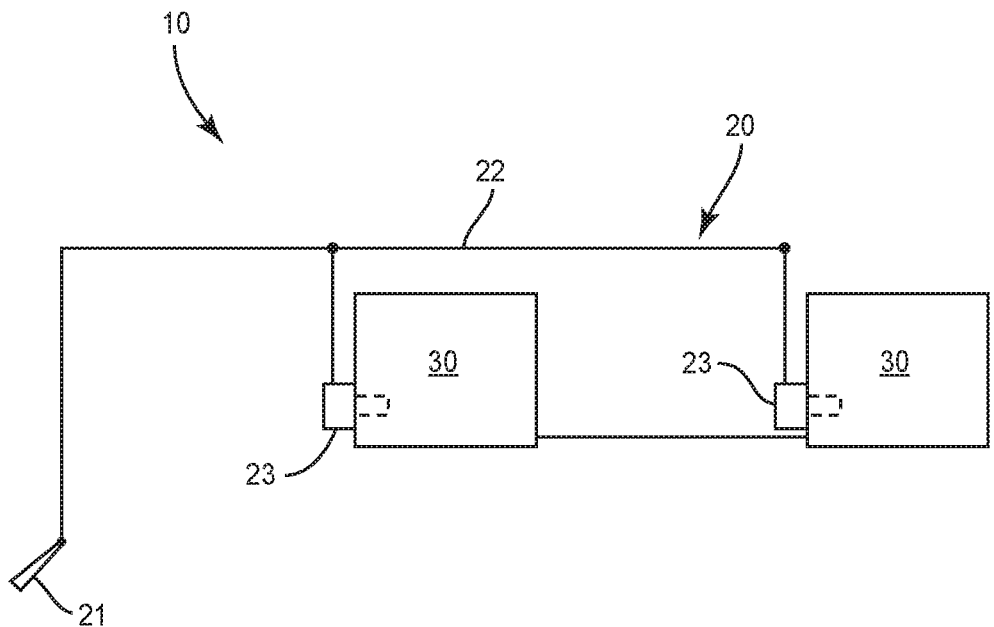
FIG. 6 is a schematic diagram of a storage system for an aircraft.
Figure 7:
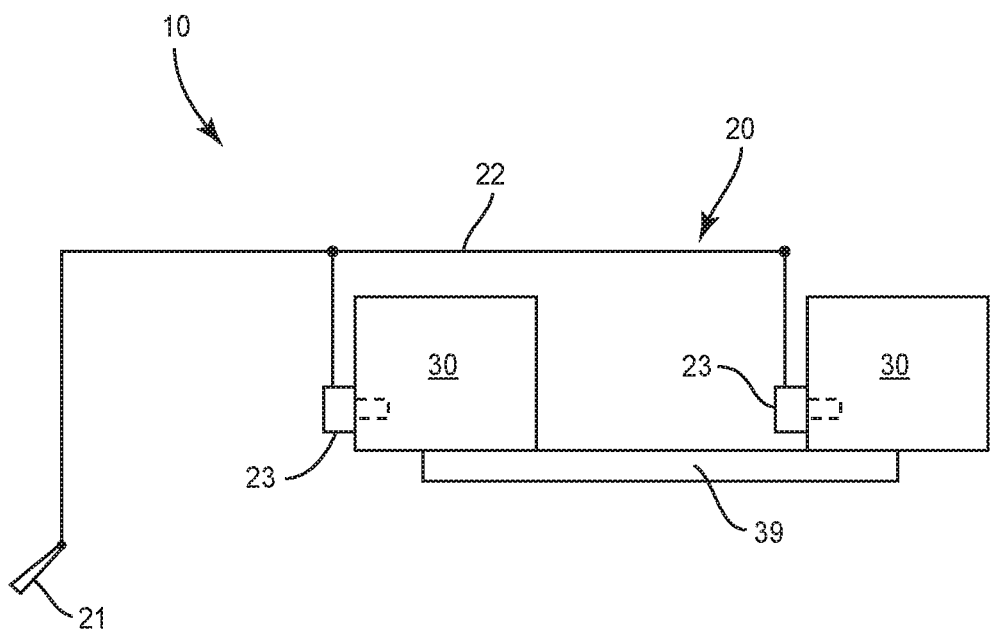
FIG. 7 is a schematic diagram of a storage system for an aircraft.

FIG. 6 illustrates an overview of a storage system 10. The storage system 10 includes storage bins 30 and a locking system 20. As disclosed, the storage bins 30 are movable between open and closed positions. The locking system 20 locks the storage bins 30 in the closed position. The locking system 20 includes pins 23 that are positioned at each of the storage bins 30. An actuation lever 21 is connected to the pins 23 through an elongated link 22. The locking system 20 is selectively movable between a locked position with the actuation lever 21 in a first position and the pins 23 engaged with the storage bins 30 to prevent the storage bins 30 from moving from the closed position. The locking system 20 can also be moved to an unlocked position with the actuation lever 21 in a second position and the pins 23 disengaged from the storage bins 30 to allow the storage bins 30 to move between the open and closed positions. FIG. 7 illustrates another design of the storage system 10 and includes the storage bins 30 connected to the support frame 39.

In the various embodiments, the locking system 20 can be configured to lock one or more storage bins 30. The locking system 20 can include one or more actuation levers 21. In one design, each of the one or more actuation levers 21 can lock each of the storage bins 30. In another design, the locking system 20 includes multiple actuation levers 21 that each locks a limited number of the storage bins 30. The one or more actuation levers 21 can be positioned at various locations within the aircraft 100. This can include but is not limited to the galley, the cockpit 105, and along an aisle 103.

Figure 8:
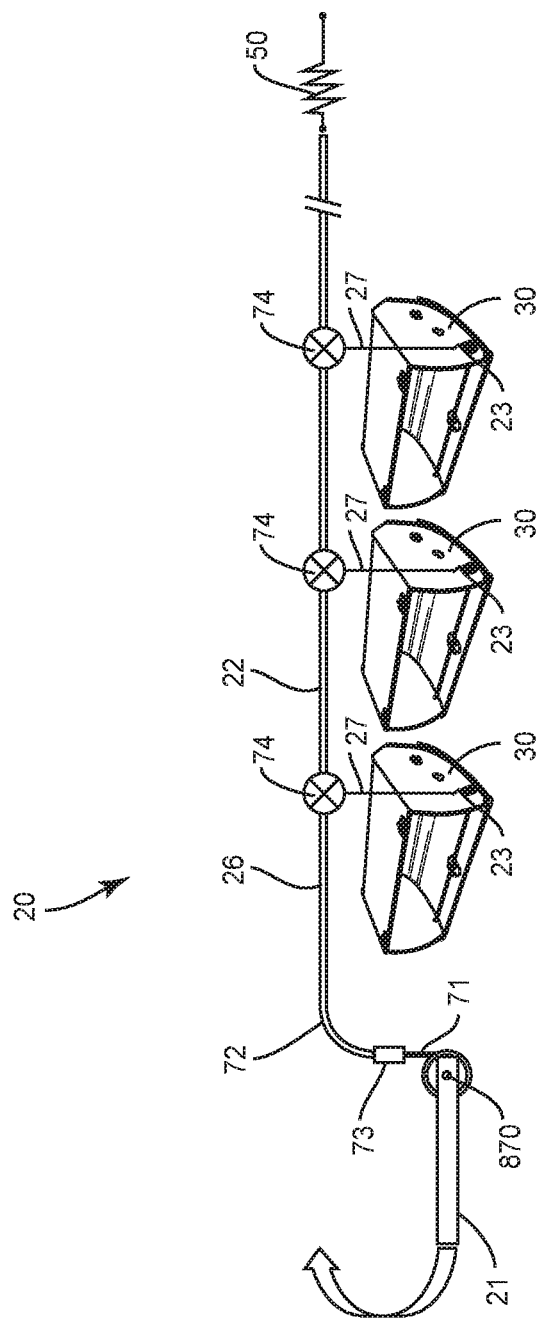
FIG. 8 is a schematic diagram of a storage system that includes storage bins and a locking system.
Figure 9:
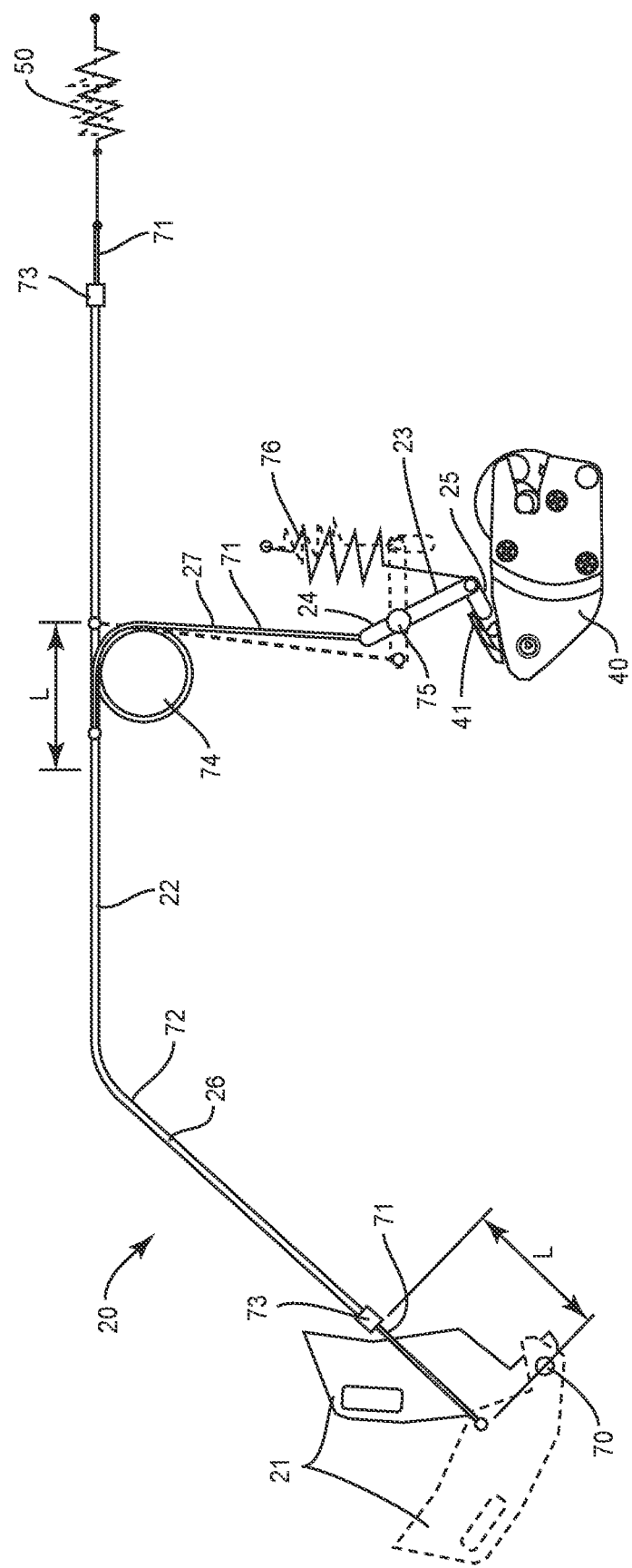
FIG. 9 is a schematic diagram that includes an elongated link that is connected to each of an actuation lever and a pin.

As illustrated in FIGS. 8 and 9, the actuation lever 21 can be movable about a pivot 70. The actuation lever 21 is movable about the pivot 70 between a first position (illustrated in solid lines in FIG. 9) in which the storage bins 30 are locked, and a second position (illustrated in dashed lines in FIG. 9) in which the storage bins 30 are unlocked. The actuation lever 21 can include a variety of different structures, including but not limited to lever arm (as illustrated), joystick, slidable handle, and a rotating member.

The elongated link 22 connects the actuation lever 21 to the pins 23. The elongated link 22 is configured to transfer the motion of the actuation lever 21 to the pins 23. The elongated link 22 can include a variety of configurations, including but not limited to wire, cable, cord, line, and chains and sprockets. In one design, the elongated link 22 includes a cable 71 that is housed within an exterior sheath 72. The sheath 72 can be fixedly mounted to the aircraft 100 while the interior cable 71 remains movable for selectively positioning the pins 23. One or more anchors 73 can be positioned along the length to secure the sheath 72 while still allowing for movement of the cable 71.

A biasing member 50 can be attached to the link 22. The biasing member 50 applies a tensioning force to the link 22. This can include being attached to and applying a force to the interior cable 71. In one design as illustrated in FIGS. 8 and 9, the biasing member 50 is positioned at an end of the link 22 opposite from the actuation lever 21. The biasing member 50 can include a variety of structures, including but not limited to a spring and an elastic member. The biasing member 50 can bias the locking system 20 towards one of the locked and unlocked positions.

The link 22 is configured to connect with each of the pins 23. The link 22 can include a main section 26 that extends between the actuation lever 21 and the biasing member 50. Offshoot sections 27 extend off from the main section and lead to and are connected to the pins 23. Pulleys 74 can be positioned along the elongated link 22 to support the link 22. In one design pulleys 74 are positioned at the intersections of the main section 26 and offshoot sections 27.

The locking system 20 is configured to engage with the storage bins 30 and prevent the storage bins 30 from moving from the locked position to the open position. This can include the pins 23 engaging with the storage bins 30 in various manners. One design includes the pins 23 contacting against the body 31 and preventing movement relative to the support frame 39. This can also include engaging with the handle 49 or latch 40 to prevent release of the latch 40.

FIG. 9 illustrates one design with each of the pins 23 engaging with the release lever 41 on the latch 40. The pin 23 includes a leg 24 and a foot 25. The leg 24 is attached to the link 22 and is movable about a pivot 75. The foot 25 extends outward from an end of the leg 24. A biasing member 76 (e.g., spring, elastic member) can be connected to the pin 23 and apply a biasing force. In one design as illustrated in FIG. 9, the cable 71 of the link 22 is attached to a first end of the leg 24 and the biasing member 76 is attached to a second end of the leg 24.

Figure 10:
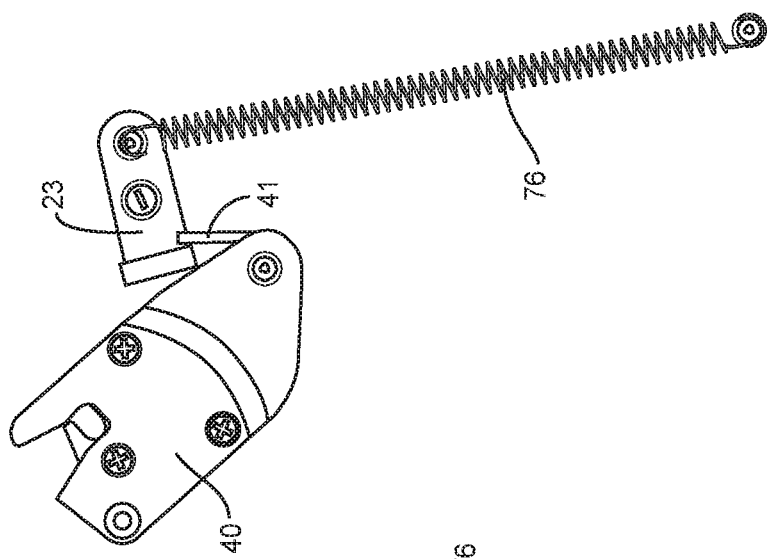
FIG. 10 is a side view of a latch in an open position and a pin disengaged from the latch.
Figure 11:
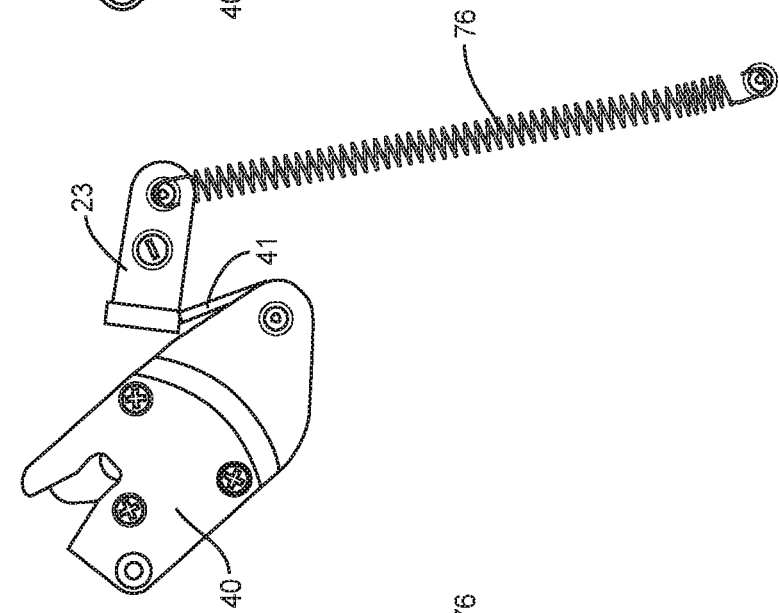
FIG. 11 is a side view of a latch in an open position and a pin engaged with the latch.
Figure 12:
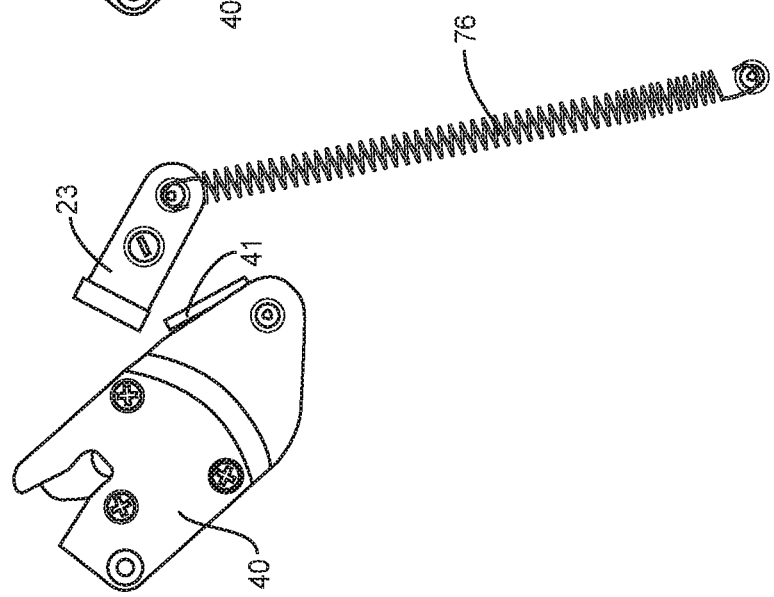
FIG. 12 is a side view of a latch in a closed position and a pin engaged with the latch.

FIGS. 10-12 illustrate the engagement of the pin 23 with the latch 40 when moving from an open position to a closed position. Both the latch 40 and the pin 23 are mounted to the support frame 39. FIG. 10 includes the relative positioning when the storage bin 30 is open and the locking system 20 is not engaged. The latch 40 is in a retracted position and the pin 23 is not engaged with the release lever 41. The biasing member 76 applies a force to the pin 23 towards the disengaged position.

FIG. 11 includes the storage bin 30 in the open position and the locking system 20 engaged with the latch 40. As illustrated, the pin 23 has moved about the pivot 75 and engages with the release lever 41. This movement is caused by a force applied to the pin 23 through the cable 71. This force from the cable 71 overcomes the force applied to the pin 23 by the biasing member 76. This positioning can be a standby mode because the storage bin 30 remains in the open position but the locking system 20 is engaged. The locking system 20 does not cause the storage bin 30 to move to the closed position (but rather prevents the storage bin 30 from being moved from the closed position when engaged). Thus, the locking system 20 can be engaged with the latch 40 when the storage bin 30 is in the open position. Upon closure of the storage bin 30, the locking system 20 will fully engaged and prevent the storage bin 30 from being opened.

FIG. 12 illustrates the relative positioning with the storage bin 30 in the closed position and the locking system 20 engaged. The pin 23 has fully engaged the release lever 41. This can include the foot 25 moving between the release lever 41 and the latch 40. In this position, the storage bin 30 is prevented from being opened, despite the movement of the handle 49 by a passenger or a trained operator.

Figure 13:
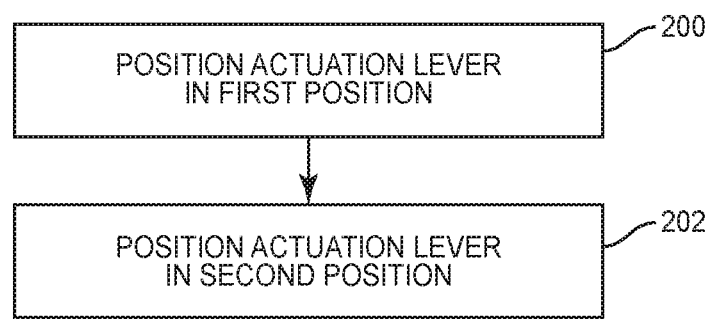
FIG. 13 is a flowchart diagram of a method of securing storage bins in a vehicle.

FIG. 13 illustrates a method of securing storage bins 30. The actuation lever 21 is positioned in a first position causing pins 23 that are operatively connected to the actuation lever 21 to move into engagement with each of the storage bins 30 to lock the storage bins 30 (block 200). The actuation lever 21 can be moved to a second position to disengage each of the pins 23 from the storage bins 30 to unlock the storage bins 30 (block 202).

In the various design, one or more of the storage bins 30 can be separate from the locking system 20. These one or more storage bins 30 can be used for supplies for the operators, emergency supplies, etc. that may need to be accessed during an event. These one or more storage bins 30 remain unlocked and accessible when the remainder of the storage bins 30 used for passenger's personal items are locked.

The aspects have been described for use within the context of an aircraft 100, and specifically a commercial aircraft 100 configured to transport passengers. These aspects can also be used on other vehicles 100. Vehicles 100 can include but are not limited to other aircraft, spacecraft, rotorcraft, terrestrial vehicles, surface water borne vehicles, sub-surface water borne vehicles, and combinations thereof.

The storage bins 30 can be used in a variety of other contexts that do not include a vehicle. For example, within a person's house, work environment, and locker room.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A storage system comprising:
storage bins that are movable between an open position and a closed position, each of the storage bins comprising a body that extends around and forms an interior space;
a latch on each of the storage bins to keep the storage bins from moving to the open position while in the closed position;
a locking system to lock the storage bins in the closed position, the locking system comprising:
an actuation lever spaced remotely from the storage bins;
a plurality of pins with one of the pins positioned at each one of the storage bins;
an elongated link that extends between and connects the actuation lever to the pins of the storage bins, the elongated link positioned away from the interior space of the storage bins, the elongated link transfers motion of the actuation lever to the pins of the storage bins;
the locking system being selectively movable between a locked position with the actuation lever in a first position and the pins engaged with the storage bins to prevent the storage bins from moving from the closed position, and an unlocked position with the actuation lever in a second position and the pins disengaged from the storage bins to allow the storage bins to move between the open and closed positions.

2. The storage system of claim 1, wherein each of the pins is biased to be disengaged from the storage bins.

3. The storage system of claim 2, further comprising a biasing member that is attached to the elongated link at a point away from the actuation lever, the biasing member applying a biasing force that biases the actuation lever towards the unlocked position.

4. The storage system of claim 1, wherein each of the pins is mounted to one of the storage bins to move with the storage bins between the open and closed positions.

5. The storage system of claim 4, wherein each of the pins comprises a leg that is attached to the elongated link and a foot that extends outward from the leg and engages with the latch on the storage bin.

6. The storage system of claim 1, wherein the elongated link comprises an inner cable that is attached to the actuation lever and an outer sheath that extends around the inner cable, the outer sheath being stationary and the inner cable moving when the actuation lever moves between the first and second positions.

7. The storage system of claim 1, wherein each of the latches comprises a release lever that is engaged by the pins in the closed position.

8. The storage system of claim 7, further comprising a support frame that supports the storage bins and pins that are attached to the support frame and engaged by the latches when the storage bins are in the closed positions.

9. The storage system of claim 1, wherein the elongated link comprises a main section that is connected to the actuation lever and offshoot sections that extend between the main section and the pins.

10. A storage system comprising:
a support frame;
storage bins that are mounted to the support frame and movable relative to the support frame between an open position and a closed position, each of the storage bins comprising:
a body that extends around and forms a interior space;
a latch mounted to the body and that engages with the support frame in the closed position;
a locking system to lock the storage bins in the closed position, the locking system comprising:
an actuation lever spaced remotely from the storage bins;
a plurality of pins that are each positioned at one of the storage bins;
an elongated link that extends from the actuation lever to each of the pins;
the locking system is movable between a locked position and an unlocked position;
in the locked position, the actuation lever is at a first position with each of the pins engaged with one of the latches to prevent the storage bins from moving from the closed position;
in the unlocked position, the actuation lever is at a second position with each of the pins disengaged from the corresponding latch to allow movement of the storage bins between the open and closed positions.

11. The storage system of claim 10, further comprising a release lever on each of the latches that unlocks the latch from the support frame and moves the storage bin to the open position, each of the pins positioned to engage with one of the release levers in the locked position.

12. The storage system of claim 10, wherein each of the pins is attached to the body of one of the storage bins.

13. The storage system of claim 10, wherein the elongated link comprises a main section that is attached to the actuation lever and bin sections that extend from the main section and are connected to one of the pins.

14. The storage system of claim 13, further comprising a biasing member that biases the main section of the elongated link to maintain the locking system in the locked position.

15. A method of securing storage bins in a vehicle, the method comprising:
positioning an actuation lever that is positioned in a cabin of the vehicle in a first position and engaging pins that are operatively connected to the actuation lever into engagement with each of a plurality of storage bins and locking the storage bins with the actuation lever being spaced remotely from the storage bins; and
moving the actuation lever to a second position and disengaging each of the pins from the storage bins and unlocking the storage bins.

16. The method of claim 15, further comprising moving an elongated link that is connected to each of the actuation lever and the pins and moving the pins out of engagement with the storage bins when moving the actuation lever from the first position to the second position.

17. The method of claim 16, further comprising maintaining an outer sheath of the elongated link stationary while moving an inner cable of the elongated link and moving the pins out of engagement with the storage bins and into engagement with the storage bins.

18. The method of claim 15, further comprising positioning each of the pins underneath a release lever on the storage bins and locking the storage bins.

19. The method of claim 15, further comprising applying a biasing force to each of the pins and biasing the pins away from the storage bins.

20. The method of claim 15, further comprising biasing the actuation lever towards an open position and out of engagement with the storage bins.

\* \* \* \* \*